C. H. FERGUSON.
MANURE CATCHER.
APPLICATION FILED AUG. 6, 1913.
1,099,030.
Patented June 2, 1914.
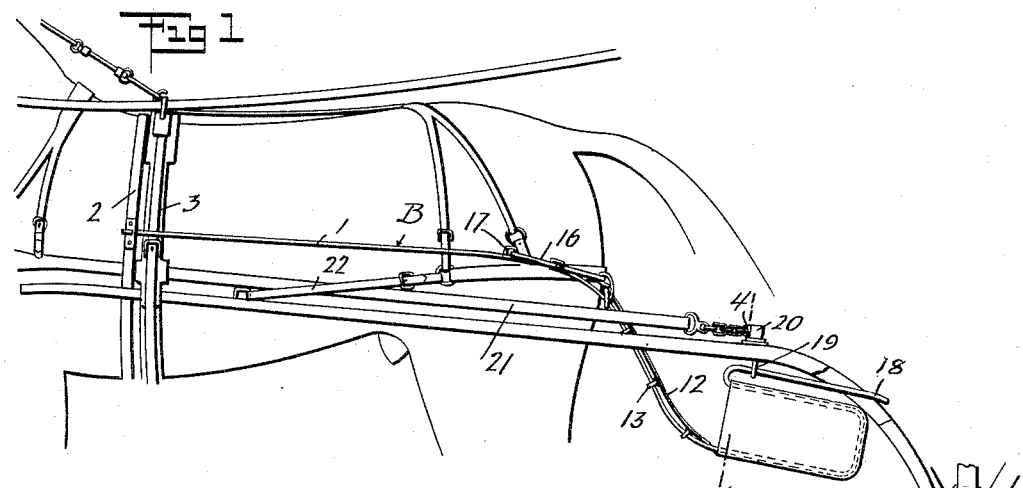
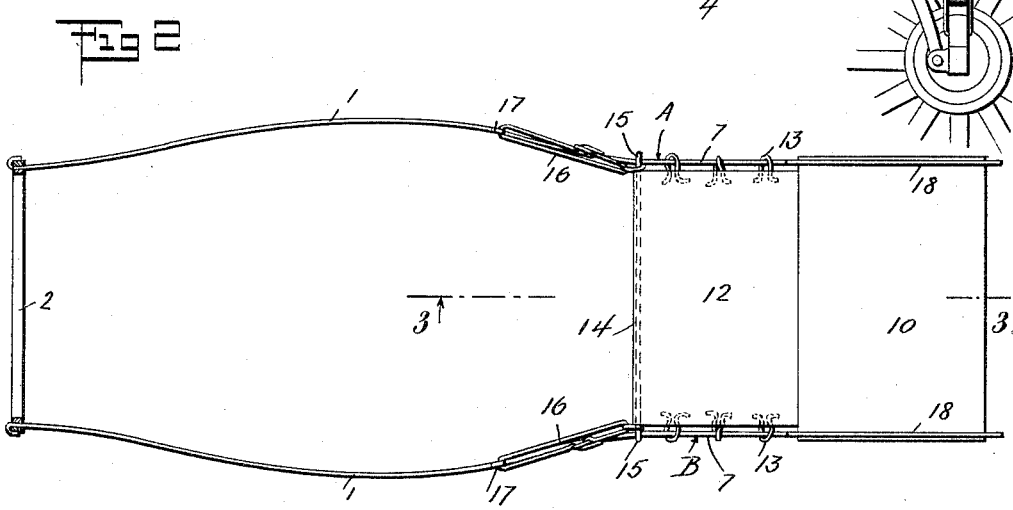
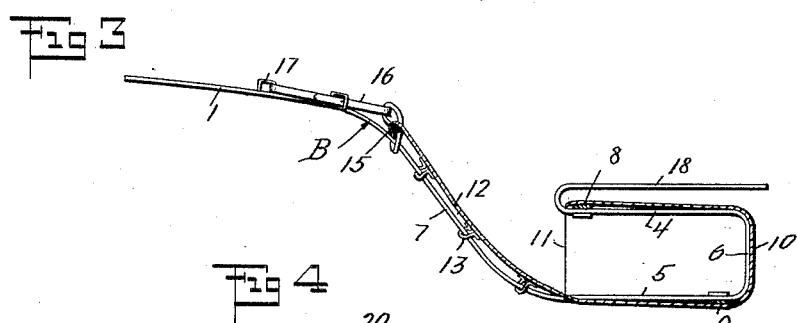
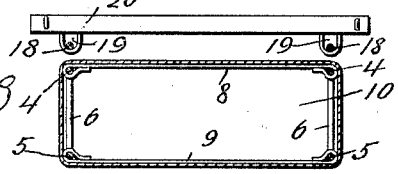
WITNESSES
C. J. Hachenberg
C. Brodway
INVENTOR
CHARLES H. FERGUSON
BY Munn&Co
ATTORNEYS

UNITED STATES PATENT OFFICE.

CHARLES H. FERGUSON, OF JERSEY CITY, NEW JERSEY.

MANURE-CATCHER.

1,099,030.  Specification of Letters Patent.  Patented June 2, 1914.

Application filed August 6, 1913. Serial No. 783,265.

*To all whom it may concern:*

Be it known that I, CHARLES H. FERGUSON, a citizen of the United States, and a resident of Jersey City, in the county of Hudson and State of New Jersey, have invented a new and Improved Manure-Catcher, of which the following is a full, clear, and exact description.

This invention relates to a manure catcher of that type which is adapted to be applied to horses while being driven through city streets, so as to prevent the dropping of manure in the streets, with the accompanying expense to the municipalities of cleaning the streets, and preventing the spread of diseases by manure dust in windy weather.

The invention has for its general objects to improve and simplify the construction of devices of the character referred to so as to be reliable and efficient in use, comparatively inexpensive to manufacture, and so designed as to be readily applied as an attachment to vehicles now in use.

A further object of the invention is the provision of a manure catcher of that type which is carried partly by the horse and partly by the vehicle, the said catcher including a receptacle which is located under and supported by the swingletree of the draft device of a vehicle, with an adjustable apron extending at an inclination upwardly from the receptacle to a point adjacent the breech of the harness, such apron being adjustable for adaptation to horses of different sizes, and by means of this apron the manure while being dropped is deflected into the receptacle and there contained until the horse is unhitched, when the manure catcher can be taken off and emptied.

A further object is the provision of means for movably supporting the manure catcher on the draft device of the vehicle so that the horse can move forwardly or backwardly with respect to the tongue or shafts without the manure catcher interfering.

With these objects in view, and others as will appear as the description proceeds, the invention comprises various novel features of construction and arrangement of parts which will be more fully described hereinafter and set forth with particularity in the claims appended hereto.

In the accompanying drawing, which illustrates one embodiment of the invention, and wherein similar reference characters are employed to designate corresponding parts throughout the several views, Figure 1 is a side view of the device shown applied to a horse hitched to a single horse-drawn vehicle; Fig. 2 is a plan view of the manure catcher; Fig. 3 is a longitudinal sectional view on the line 3—3 of Fig. 2; and Fig. 4 is a transverse sectional view on the line 4—4 of Fig. 1.

The manure catching device is applicable to any ordinary type of draft device for vehicles, such as a pair of shafts with a single whiffle-tree or a tongue with double whiffle-trees. In the present instance the manure catcher is shown applied to a draft device for a single horse-drawn vehicle, but it is to be understood that in all cases the manure catcher will be attached at its rear end to the whiffle-trees and at its forward end to a belt or band that encircles the horse just forward of the saddle of the harness.

The manure catcher comprises a frame structure made of iron rods or the like, and comprises two side elements A and B that are approximately parallel and suitably spaced apart. The forward portion of each element is shaped into a thill-like member 1, and these members of the two elements are spaced apart to present the appearance of thills or shafts which extend along opposite sides of the horse at a point above the traces of the harness. The front ends of the thill members 1 are connected with a band or strap 2 which encircles the horse, as shown in Fig. 1, just forward of the saddle 3 of the harness. The rear portions of the side elements A and B of the manure catcher are each formed into a rectangular loop consisting of horizontal members 4 and 5 united by a connecting portion 6, the lower horizontal member 5 being connected with a thill member 1 by an inclined connecting portion 7. The framework of the manure catcher is completed by upper and lower cross-bars 8 and 9 which are rigidly connected respectively with the forward ends of the upper members 4 and the rear ends of the lower members 5. The loops formed by the members 4, 5 and 6 and the loop connecting bars 8 and 9, constitute the frame or body of the receptacle in which the manure is caught. This receptacle constitutes a canvas bag or other body 10 which is open only at the front 11, and extending forwardly from the front open end is an apron 12 which has at its lateral edges rings, eyes or equivalent devices 13 that slide on the inclined portions 7 of the elements A and B. The front of the apron is fastened to a cross-bar 14 which terminates in eyes 15 slidable on the inclined portions 7, said bar 14 serving to hold the apron in proper relation to the horse and preventing sagging of the middle of the apron at the front edge.

Means for holding the apron in operative position with respect to the thill members 1 are provided. These means may be of any suitable design, but in the present instance they are shown as straps 16 which are connected with the ends of the bar 14 and with the loops, eyes or equivalent devices 17 on the members 1 of the elements A and B. These straps are adjustable so that the apron can be drawn forwardly to any desired extent, according to the position of the horse.

The attachment is supported only partly by the horse, and consequently provision is made for supporting the rear portion of the catcher on the draft device of the vehicle, preferably on the whiffle-trees of the draft device. The connection of the manure catcher with the whiffle-tree must be movable or slidable so that the horse is free to move back and forth when harnessed to the vehicle. For this purpose the upper members 4 of the frame of the receptacle 10 are formed with horizontal extensions or bars 18 which are parallel to each other, and these bars slidably engage in eyes, staples or equivalent devices 19 fastened to the bottom of the whiffle-tree 20. As long as the horse is hitched to the vehicle the bars 18 will be maintained in engagement with the supporting eyes or holders 19, as the horse moves back and forth within the limited play provided by the traces 21 and back straps 22, but when the horse is unhitched the manure catcher can be detached by moving the same forwardly to thereby disengage the bars 18 from the holders 19. When so detached the receptacle 10 can be readily emptied.

From the foregoing description taken in connection with the accompanying drawings, the advantages of the construction and method of operation will be readily understood by those skilled in the art to which the invention appertains, and while I have described the principle of operation, together with the device which I now consider to be the best embodiment thereof, I desire to have it understood that the device shown is merely illustrative, and that such changes may be made when desired as are within the scope of the appended claims.

Having thus described my invention, I claim as new and desire to secure by Letters Patent:

1. A manure catcher of the class described comprising a receptacle, a frame supporting the receptacle and having members projecting forwardly from the receptacle and spaced apart to extend along the sides of a horse, means for attaching the forward ends of the said members to a horse, means for movably connecting the rear portion of the frame to a vehicle, an apron extending forwardly from the receptacle, and devices connected with the said members for adjusting the apron and holding the latter in place.

2. A manure catcher comprising a receptacle, members connected with and disposed above the receptacle, devices in which the members slide back and forth and which serve to connect the catcher with a vehicle, rods extending forwardly from the receptacle and spaced apart to lie at opposite sides of the horse attached to the vehicle, and means for attaching the rods to the horse.

3. A manure catcher comprising a receptacle, members connected with and disposed above the receptacle, devices in which the members slide back and forth and which serve to connect the catcher with a vehicle, rods extending forwardly from the receptacle and spaced apart to lie at opposite sides of the horse attached to the vehicle, means for attaching the rods to the horse, an apron extending forwardly from the receptacle, means connecting the side edges of the apron with the rods, and straps connected with the forward portions of the apron and extending forwardly therefrom and connected with the rods.

4. A manure catcher of the class described comprising side elements, a receptacle carried on the rear portion of the side elements, said side elements being inclined upwardly from the receptacle and thence forwardly, an apron extending from the receptacle and slidably connected with the said inclined portions of the side elements, and adjustable devices connected with the forward corners of the apron and with the forwardly-extending portions of the side elements.

5. A manure catcher of the class described comprising side elements, a receptacle carried on the rear portion of the side elements, said elements being inclined upwardly from the receptacle and thence forwardly, an apron extending from the receptacle and slidably connected with the said inclined portions of the side elements, adjustable devices connected with the forward corners of the apron and with the forwardly-extending portions of the side elements, and devices on the side elements and disposed above the receptacle for connecting the manure catcher with the draft device of a vehicle.

6. A manure catcher of the class described comprising side elements, a receptacle carried on the rear portion of the side elements, said elements being inclined upwardly from the receptacle and thence forwardly, an apron extending from the receptacle and slidably connected with the said inclined portions of the side elements, adjustable devices connected with the forward corners of the apron and with the forwardly-extending portions of the side elements, devices on the side elements and disposed above the receptacle for connecting the manure catcher with the draft device of a vehicle, and a band connected with the forward ends of the forwardly-extending portions of the side elements for attaching the manure catcher to a horse.

In testimony whereof I have signed my name to this specification in the presence of two subscribing witnesses.

CHARLES H. FERGUSON.

Witnesses:
   CHATTEN BRADWAY,
   GEORGE H. EMSLIE.

---

Copies of this patent may be obtained for five cents each, by addressing the "Commissioner of Patents, Washington, D. C."